US007243063B2

(12) United States Patent
Ramakrishnan et al.

(10) Patent No.: US 7,243,063 B2
(45) Date of Patent: Jul. 10, 2007

(54) CLASSIFIER-BASED NON-LINEAR PROJECTION FOR CONTINUOUS SPEECH SEGMENTATION

(75) Inventors: Bhiksha Ramakrishnan, Watertown, MA (US); Rita Singh, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1073 days.

(21) Appl. No.: 10/196,768

(22) Filed: Jul. 17, 2002

(65) Prior Publication Data

US 2004/0015352 A1 Jan. 22, 2004

(51) Int. Cl.
*G10L 11/06* (2006.01)
*G10L 15/20* (2006.01)

(52) U.S. Cl. .................................... 704/215; 704/233

(58) Field of Classification Search ..................... None
See application file for complete search history.

(56) References Cited

U.S. PATENT DOCUMENTS

| | | | | |
|---|---|---|---|---|
| 5,276,766 | A * | 1/1994 | Bahl et al. | 704/256.4 |
| 5,754,681 | A * | 5/1998 | Watanabe et al. | 382/159 |
| 6,226,408 | B1 * | 5/2001 | Sirosh | 382/224 |
| 6,556,967 | B1 * | 4/2003 | Nelson et al. | 704/233 |
| 6,862,567 | B1 * | 3/2005 | Gao | 704/228 |
| 2005/0065793 | A1 * | 3/2005 | Choi et al. | 704/240 |

OTHER PUBLICATIONS

Singh, R. Seltzer, M. Raj, B. Stern, R. "Speech in Noisy Environments: robust automatic segmentation, feature extraction, and hypothesis combination", Acoustics, Speech and Signal processing, May 2001, pp. 273-276.*

Raj, B. Singh, R. Stern, R. "Interference of Missing Spectrographic Features for Robust Speech Recognition" Proc 5th International conference on spoken language processing, 1999.*

Sun, D. "Feature dimension reduction using reduced-rank maximum estimation for hidden markov models" Spoken language ICSLP pp. 244-247 1996.*

Hermansky, H. Sharma, S. Jain, P. "Data-derived nonlinear mapping for feature extraction in HMM" in Proc. ICASSP 2000 Istanbul.*

Kocsor, A. Kuba, A. Toth, L. "Phoneme Classification Using Kernel Principle Component Analysis" Periodica Polytechnica Electrical Engineering, 2000, vol. 44, No. 1, p. 77-90.*

Lamel, L., Rabiner, L.R., Rosenberg, A., and Wilpon, J., "*An improved endpoint detector for isolated word recognition*," IEEE ASSP magazine, vol. 29, 777-785, 1981.

(Continued)

*Primary Examiner*—David Hudspeth
*Assistant Examiner*—Matthew J. Sked
(74) *Attorney, Agent, or Firm*—Dirk Brinkman; Clifton D. Mueller; Gene V. Vinokur

(57) ABSTRACT

A method segments an audio signal including frames into non-speech and speech segments. First, high-dimensional spectral features are extracted from the audio signal. The high-dimensional features are then projected non-linearly to low-dimensional features that are subsequently averaged using a sliding window and weighted averages. A linear discriminant is applied to the averaged low-dimensional features to determine a threshold separating the low-dimensional features. The linear discriminant can be determined from a Gaussian mixture or a polynomial applied to a bi-model histogram distribution of the low-dimensional features. Then, the threshold can be used to classify the frames into either non-speech or speech segments. Speech segments having a very short duration can be discarded, and the longer speech segments can be further extended. In batch-mode or real-time the threshold can be updated continuously.

27 Claims, 1 Drawing Sheet

OTHER PUBLICATIONS

Junqua, J.-C., Mak, B., and Reaves, B., "A robust algorithm for word boundary detection in the presence of noise," IEEE trans. on Speech and Audio Proc., vol. 2, No. 3, 406-412, 1994.

Hain, T., and Woodland, P.C., "*Segmentation and classification of broadcast news audio*," Proceedings of the International conference on speech and language processing ICSLP98, pp. 2727-2730, 1998.

Siegler, M., Jain, U., Raj, B., and Stern, R.M., "*Automatic segmentation, classification and clustering of broadcast news audio*," Proceedings of the DARPA speech recognition workshop Feb. 1997, pp. 97-99, 1997.

Viterbi, A.J., "*Error bounds for convolutional codes and an asymptotically optimum decoding algorithm*," IEEE Trans. on Information theory, 260-269, 1967.

Leggetter, C.J., and Woodland, P.C., "*Speaker adaptation of HMMs using linear regression*," Technical report CUED/F-INFENG/TR. 181, Cambridge University, 1994.

Doh, S.-J., "*Enhancements to transformation-based speaker adaptation: principal component and inter-class maximum likelihood linear regression*," Ph.D thesis, Carnegie Mellon University, 2000.

* cited by examiner

CLASSIFIER-BASED NON-LINEAR PROJECTION FOR CONTINUOUS SPEECH SEGMENTATION

STATEMENT REGARDING FEDERALLY-SPONSORED RESEARCH

This invention was made with United State Government support awarded by the Space and Naval Warfare Systems Center, San Diego, under Grant No. N66001-99-1-8905. The United State Government has rights in this invention.

FIELD OF THE INVENTION

This invention relates generally to speech recognition, and more particularly to segmenting a continuous audio signal into non-speech and speech segments so that only the speech segments can be recognized.

BACKGROUND OF THE INVENTION

Most prior art automatic speech recognition (ASR) systems generally have little difficulty in generating recognition hypotheses for long segments of a continuously recorded audio signal containing speech. When the signal is recorded in a controlled, quiet environment, the hypotheses generated by decoding long segments of the audio signal are almost as good as those generated by selectively decoding only those segments that contain speech. This is mainly because when the audio signal is acoustically clean, silence is easily recognized as such and is clearly distinguishable from speech. However, when the signal is noisy, known ASR systems have difficulties in clearly discerning whether a given segment in the audio signal is speech or noise. Often, spurious speech is recognized in noisy segments where there is no speech at all.

Speech Segmentation

This problem can be avoided if the beginning and ending boundaries of segments of the audio signal containing speech are identified prior to recognition, and recognition is performed only within these boundaries. The process of identifying these boundaries is commonly referred to as endpoint detection, or speech segmentation. A number of speech segmentation methods are known. These can be roughly categorized as rule-based methods and classifier-based methods.

Rule-Based Segmentation

Rule-based methods use heuristically derived rules relating to some measurable properties of the audio signal to discriminate between speech and non-speech segments. The most commonly used property is the variation in the energy in the signal. Rules based on energy are usually supplemented by other information such as durations of speech and non-speech events, see Lamel, L., Rabiner, L. R., Rosenberg, A., and Wilpon, J., "*An improved endpoint detector for isolated word recognition*," IEEE ASSP magazine, Vol. 29, 777-785, 1981, zero crossings, Rabiner, L. R. and Sambur, M. R., "*An algorithm for determining the endpoints of isolated utterances*," Bell Syst. Tech. J., Vol. 54, No. 2, 297-315, 1975, pitch Hamada, M., Takizawa, Y. Norimatsu, T., "*A noise-robust speech recognition system*," Proceedings of the International conference on speech and language processing ICSLP90, pp. 893-896, 1990.

Other notable methods in this category use time-frequency information to locate segments of the signal that can be reliably tagged and then expanded to adjacent segments, Junqua, J.-C., Mak, B., and Reaves, B., "*A robust algorithm for word boundary detection in the presence of noise*," IEEE trans. on Speech and Audio Proc., Vol. 2, No. 3, 406-412, 1994.

Classifier-Based Segmentation

Classifier-based methods model speech and non-speech events as separate classes and treat the problem of speech segmentation as one of classification. The distributions of classes may be modeled by static distributions, such as Gaussian mixtures, Hain, T., and Woodland, P. C., "*Segmentation and classification of broadcast news audio*," Proceedings of the International conference on speech and language processing ICSLP98, pp. 2727-2730, 1998, or the models can use dynamic structures such as hidden Markov models, Acero, A., Crespo, C., De la Torre, C., and Torrecilla, J. C., "*Robust HMM-based endpoint detector*," Proceedings of Eurospeech'93, pp. 1551-1554, 1993. More sophisticated versions use the speech recognizer itself as an endpoint detector.

Generally, these methods use a priori information about the signal, as stored by the classifier, for endpointing. Hence, these methods are not well-suited for real-time implementations. Some endpointing methods do not clearly belong to either of the two categories, e.g., some methods use only the local variations in the statistical properties of the incoming signal to detect endpoints, Siegler, M., Jain, U., Raj, B., and Stern, R. M., "*Automatic segmentation, classification and clustering of broadcast news audio*," Proceedings of the DARPA speech recognition workshop February 1997, pp. 97-99, 1997.

Rule-based segmentation has two main problems. First, the rules are specific to the feature set used for endpoint detection, and new rules must be generated for every new feature considered. Due to this problem, only a small set of features for which rules are easily derived is commonly used. Second, the parameters of the applied rules must be fine tuned to the specific acoustic conditions of the signal, and do not easily generalize to other recording conditions.

Classifier-based segmenters, on the other hand, use feature representations of the entire spectrum of the signal for endpoint detection. Because classifier-based methods use more information, they can be expected to perform better than rule-based segmenters. However, they also have problems. Classifier-based segmenters are specific to the kind of recording environments for which they are trained. For example, classifiers trained on clean speech perform poorly on noisy speech, and vice versa. Therefore, classifiers must be adapted to a specific recording environments, and thus, are not well suited for any recording condition.

Because feature representations usually have many dimensions, typically 12-40 dimensions, adaptation of classifier parameters requires relatively large amounts of data. Even then, large improvements in speech and non-speech segmentation is not always observed, see Hain et al, above.

Moreover, when adaptation is to be performed, the segmentation process becomes slower and more complex. This can increase the time lag or latency between the time at which endpoints occur and the time at which they are detected, which may affect real-time implementations. When classes are modeled by dynamic structures such as HMMs, the decoding strategies used can introduce further latencies, e.g., see Viterbi, A. J., "*Error bounds for convolutional codes and an asymptotically optimum decoding algorithm*," IEEE Trans. on Information theory, 260-269, 1967.

Recognizer-based endpoint detection involves even greater latency because a single pass of recognition rarely results in good segmentation and must be refined by additional passes after adapting the acoustic models used by the recognizer. The problems of high dimensionality and higher latency make classifier-based segmentation less effective for most real-time implementations. Consequently, classifier-based segmentation is mainly used in off-line or batch-mode implementations.

Therefore, there is a need for a speech segmentation method that can be applied, in batch-mode and real-time, to a continuous audio signal recorded under varying acoustic conditions.

SUMMARY OF THE INVENTION

The invention provides a method for segmenting audio signals into speech and non-speech segments by detecting the boundaries of the segments. The method according to the invention is based on non-linear likelihood-based projections derived from a Bayesian classifier.

The method utilizes class distributions in a speech/non-speech classifier to project high-dimensional features of the audio signal into a two-dimensional space where, in the ideal case, optimal classification could be performed with a linear discriminant.

The projection to two-dimensional space results in a transformation from diffuse, nebulous classes in a high-dimensional space, to compact classes in a low-dimensional space. In the low-dimensional space, the classes can be easily separated using clustering mechanisms.

In the low-dimensional space, decision boundaries for optimal classification can be more easily identified using clustering criteria. The present segmentation method utilizes this property to continuously determine and update optimal classification thresholds for the audio signal being segmented. The method according to the invention performs comparably to manual segmentation methods under extremely diverse environmental noise conditions.

More particularly, a method segments an audio signal including frames into non-speech and speech segments. First, high-dimensional spectral features are extracted from the audio signal. The high-dimensional features are then projected non-linearly to low-dimensional features that are subsequently averaged using a sliding window and weighted averages.

A linear discriminant is applied to the averaged low-dimensional features to determine a threshold separating the low-dimensional features. The linear discriminant can be determined from a Gaussian mixture or a polynomial applied to a bi-model histogram distribution of the low-dimensional features. Then, the threshold can be used to classify the frames into either non-speech or speech segments.

In post-processing steps, speech segments having a very short duration can be discarded, and the longer speech segments can be further extended. In batch-mode or real-time the threshold can be updated continuously.

DETAILED DESCRIPTION OF THE PREFERRED EMBODIMENT

Figure 1:
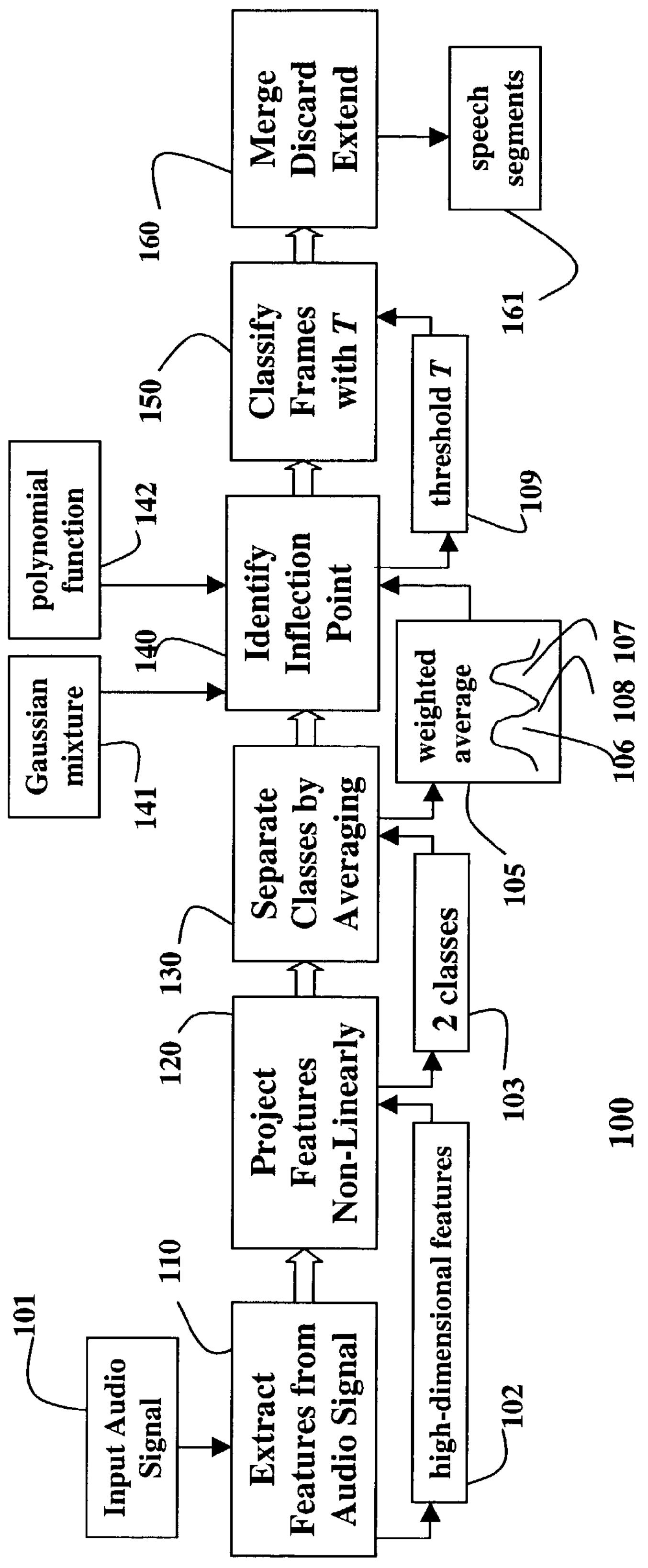
FIG. 1 is flow diagram of a method for segmenting an audio signal into non-speech and speech segments according to the invention.

FIG. 1 shows a classifier-based method 100 for speech segmentation or end-pointing. The method is based on non-linear likelihood projections derived from a Bayesian classifier. In the present method, high-dimensional features 102 are first extracted 110 from a continuous input audio signal 101. The high-dimensional features are projected non-linearly 120 onto a two-dimensional space 103 using class distributions.

In this two-dimensional space, the separation between two classes 103 is further increased by an averaging operation 130. Rather than adapting classifier distributions, the present method continuously updates an estimate of an optimal classification boundary, a threshold T 109, in this two-dimensional space. The method performs well on audio signals recorded under extremely diverse acoustic conditions, and is highly effective in noisy environments, resulting in minimal loss of recognition accuracy when compared with manual segmentation.

Speech Segmentation Features

In the input audio signal 101, the audio features 102 of segments including speech differ from the features of non-speech segments in many ways. The energy levels, energy flow patterns, spectral patterns and temporal dynamics of speech segments are consistently different from those of non-speech segments. Because the object of endpointing is to accurately distinguish speech from non-speech, it is advantageous to use representations of the audio signal that capture as many distinguishing features 102 of the audio signal as possible.

A convenient representation that captures many of these characteristics is that used by automatic speech recognition (ASR) systems. In ASR systems, the audio signal is typically represented by transformations of spectral features, or short-term Fourier transform representation of the speech signal. The representations are usually further augmented by difference features that capture trends in the basic feature, see Rabiner, M. R., and Juang, B. H., "*Fundamentals of speech recognition*," Prentice Hall Signal Processing Series, Prentice Hall, Englewood Cliffs, N.J., 1993. All dimensions of these features contain information that can be used to distinguish speech from non-speech segments.

Unfortunately, the feature representation 102 tends to have a relatively high number of dimensions. For example, typical cepstral vectors are 13-dimensional which become 26-dimensional when supplemented by difference vectors.

When dealing with high-dimensional features, one would expect it to be simpler and much more effective to use Bayesian classifiers to distinguish speech from non-speech, than to use any rule based detector. However, Bayesian classifiers are fraught with problems. As is well known, any classifier that attempts to perform classification based only on classifier distributions and classification criteria established a priori will fail when the input signal 101 does do not match the training signal that was used to estimate the parameters of the classifier.

Typical solutions to this problem involve learning distributions for the classes using a large variety of audio signals, so that the classes generalize to a large number of acoustic conditions. However, it is impossible to predict every kind of acoustic signal that will ever be encountered, and mismatches between the input signal and the distributions used by the classifier are bound to occur.

To compensate for this, the distributions of the classifier must be adapted to the input audio signal itself. Adaptation methods that could be used are either maximum a posteriori (MAP) adaptation methods, Duda, R. O., Hart, P. E., and Stork, D. G., "*Pattern classification*," Second-Edition, John Wiley and Sons Inc., 2000, extended MAP, Lasry, M. J., and Stern, R. M., "*A posteriori estimation of correlated jointly Gaussian mean vectors*." IEEE Trans. On Pattern Analysis and Machine Intelligence, Vol. 6, 530-535, 1984, or maximum likelihood (ML) adaptation methods such as MLLR, Leggetter, C. J., and Woodland, P. C., "*Speaker adaptation of HMMs using linear regression*," Technical report CUED/F-INFENG/TR. 181, Cambridge University, 1994.

In high-dimensional feature spaces, both MAP and ML methods require moderately large amounts of data. In most cases, no labeled samples of the input signal are available. Therefore, the adaptation is unsupervised. MAP adaptation has not, in general, proved effective in unsupervised adaptation scenarios, see Doh, S.-J., "*Enhancements to transformation-based speaker adaptation: principal component and inter-class maximum likelihood linear regression*," Ph.D thesis, Carnegie Mellon University, 2000.

Even ML adaptation does not result in large improvements in classification over that given by the original mismatched classifier in the case of speech/non-speech classification, e.g., see Hain, T. et. al., (1998). Also, in the high-dimensional feature spaces, MAP and ML adaptation methods require multiple passes over the signal and are computationally expensive. In real-time applications, this is a problem, because endpoint detection is expected to be a low computation task. On the whole, it is clear that working directly in the high-dimensional feature spaces of classifiers suffers, and is inefficient in the context of endpointing.

We minimize the inefficiencies due to the high-dimensional spectral features by projecting 120 the feature vectors down to a lower-dimensional space. However, such a projection must retain all classification information from the original high-dimensional space. Linear projections, such as the Karhunen-Loeve transform (KLT) and linear discriminant analysis (LDA), result in loss of information when the dimensionality of the reduced-dimensional space is too small. Therefore, the invention uses discriminant analysis for a non-linear dimensionality reducing projection 120 that is guaranteed not to result in any loss in classification performance under ideal conditions.

Likelihoods as Discriminant Projections

Bayesian classification can be viewed as a combination of a nonlinear projection and a classification with linear discriminants 141-142. When attempting to distinguish between classes, d-dimensional data vectors are projected onto an N-dimensional space, using the distributions or densities of the classes. The projection is a non-linear projection where each dimension is a monotonic function. Typically, the function is a logarithm of the probability of the vector or the probability density value at the vector given by the probability distribution or density of one of the classes. Thus, an incoming d-dimensional vector X is now replaced by the vector D(X), which is determined by $$\begin{aligned} Y = D(X) &= [\log(P(X|C_1))\log(P(X|C_2))\ldots\log(P(X|C_N))] \\ &= [Y_1 Y_2 \ldots Y_N]. \end{aligned} \quad (1)$$

The $i^{th}$ element of the vector $Y_i$, given by $\log(P(X|C_i))$, is the of the probability or density of the vector X determined using the probability distribution or density of the $i^{the}$ class, $C_i$. We refer to this term as the likelihood of class $C_i$.

This constitutes a reduction from d-dimensions down to N-dimensions when N<d. We refer to this projection as a likelihood projection. In the new N-dimensional space, the optimal discriminant function between any two classes $C_j$ and $C_j$ is now a simple linear discriminant of the form:

$$Y_i = Y_j + \epsilon_{i,j}, \quad (2)$$

where $\epsilon_{i,j}$ is an additive constant that is specific to the discriminant for classes $C_j$ and $C_j$. These linear discriminants define hyperplanes that lie at 45° degrees to the axes representing the two classes. In the N-dimensional space, the decision regions for any class is the region bounded by the hyperplanes $$Y_i = Y_j + \epsilon_{i,j},\ J=1, 2, \ldots, N, j \neq i. \quad (3)$$

The optimal decision surface for class $C_i$ is the surface bounding this region. The noteworthy fact about the likelihood projection is that the classification error expected from the simple optimal linear discriminants in the likelihood space is the same as that expected with the more complicated optimal discriminant in the original space. Thus, the likelihood projection 120 constitutes a dimensionality reducing projection that accrues no loss whatsoever of information relating to classification.

Note, the terms in equation (1) can be scaled by a term $\alpha_x$ defined as $$\alpha_x = \frac{P(C_i)}{P(C_1)P(X|C_1) + P(C_2)P(X|C_2) + \ldots P(C_N)P(X|C_N)}, \quad (4)$$

where $P(C_i)$ is an a priori probability of $C_i$. The value Y now represents the vector of the log of an a posteriori probabilities of the classes. The scaled terms still have all the same properties as before, and the optimal classifiers are still linear discriminants.

For a two-class classifier, such as a speech/non-speech classifier, the likelihood projection can be further reduces by projecting onto an axis defined by the equation $$Y_1 + Y_2 = 0 \quad (5)$$

that is orthogonal to the optimal linear discriminant $Y_1 = Y_2 + \epsilon_{1,2}$. The unit vector u along the axis defined by equation (5) is $[1/\sqrt{2}, -1/\sqrt{2}]$, and the projection Z of any vector $Y=[Y_1, Y_2]$, derived from a high-dimensional vector X, onto this axis is given by Y.u, determined by $$Z = \frac{Y_1}{\sqrt{2}} - \frac{Y_2}{\sqrt{2}} = \frac{1}{\sqrt{2}}(\log(P(X|C_1)) - \log(P(X|C_2))). \quad (6)$$

The multiplicative constant $$\frac{1}{\sqrt{2}}$$

is merely a scaling factor and can be ignored. Hence the projection Z can be equivalently defined as $$Z = Y_1 - Y_2 = \log(P(X|C_1)) - \log(P(X|C_2)). \quad (7)$$

A histogram of such a one-dimensional projection of the speech and non-speech vectors has a distinctive bi-modal distribution connected by an inflection point. The position of the inflection point actually defines the optimal classification threshold between speech and non-speech segments.

The optimal linear discriminant in the two-dimensional likelihood projection space is guaranteed to perform as well as the optimal classifier in the original multidimensional space only if the likelihoods of the classes are determined using the true distribution or density of the two classes. When the distributions used for the projection are not the true distributions, we are still guaranteed that the classification performance of the optimal linear discriminant on the projected features is no worse than the performance obtainable using these distributions for classification in the original high-dimensional space.

However, while we know that such an optimal linear discriminant exists, it may not be easily determinable because the projecting distributions themselves hold no information about the optimal discriminant. The optimal discriminant must be estimated from the properties of the input audio signal itself.

If a histogram of the likelihood-difference features of a signal where the speech and non-speech distributions overlap to such a degree that the histogram exhibits only one clear mode, then threshold value corresponding to the optimal linear discriminant cannot therefore be determined from this distribution. Clearly, the classes need to be separated further in order to improve our chances of locating the optimal decision boundary between them.

In the next section we describe how the separation between the classes in the space of likelihood differences can be increased by the averaging operation 130.

Averaging the Separation Between Classes

Let us begin by defining a measure of the separation between two classes $C_1$ and $C_2$ of a scalar random variable Z, whose means are given by $\mu_1$ and $\mu_2$, and their variances by $V_1$ and $V_2$, respectively. We can define a function $F(C_1, C_2)$ as $$F(C_1, C_2) = \frac{(\mu_1 - \mu_2)^2}{c_1 V_1 + c_2 V_2}, \tag{8}$$

where $c_1$ and $c_2$ are the fraction of data points in classes $C_1$ and $C_2$, respectively. This ratio is analogous to the criterion, sometimes called the Fischer ratio or the F-ratio, used by the Fischer linear discriminant to quantify the separation between two classes, see Duda, R. O. et. al., (2000).

Therefore, we refer to the quantity in equation (8) as the F-ratio. The difference between the Fischer ratio and equation (8) is that equation (8) is stated in terms of variances and fractions of data, rather than scatters. Like the Fischer ratio, the F-ratio in equation (8) is a good measure of the separation between classes. The greater the ratio, the greater the separation, and vice versa.

Consider a new random variable $\overline{Z}$ that has been derived from Z by replacing every sample of Z by the weighted average of K samples of Z, all of which are taken from a single class, either $C_1$ or $C_2$.

The new random variable $\overline{Z}$ is given by $$\overline{Z} = \sum_{i=1}^{K} w_i Z_i, \tag{9}$$

where $Z_i$ is the $i^{th}$ sample of Z used to obtain $\overline{Z}$, $0 \leqq w_i \leqq 1$, and all the weights $w_i$ sum to one. Because all the samples of Z that were used to construct $\overline{Z}$ come from the same class, that sample of $\overline{Z}$ is associated with that class. Thus all samples of $\overline{Z}$ correspond to either $C_1$ or $C_2$. The mean of the samples of $\overline{Z}$ that correspond to class $C_1$ is now given by $$\overline{\mu}_1 = E(\overline{Z} \mid C_1) = \sum_{i=1}^{K} w_i E(Z \mid C_1) = \mu_1. \tag{10}$$

The mean of class $C_2$ is similarly obtained.

The variance of the samples of $\overline{Z}$ belonging to class $C_1$ is given by $$\begin{aligned} \overline{V}_1 &= E\left(\left(\sum_{i=1}^{K} w_i Z_i - \mu_i\right)^2\right) = E\left(\left(\sum_{i=1}^{K} w_i Z_i - \mu_i\right)^2\right) \\ &= \sum_{i=1}^{K}\sum_{j=1}^{K} w_i w_j E((Z_i - \mu_i)(Z - \mu_i)) \\ &= V_1 \sum_{i=1}^{K}\sum_{j=1}^{K} w_i w_j r_{ij}, \end{aligned} \tag{11}$$

where $r_{ij}$ is the relative covariance between $Z_i$ and $Z_j$. If the various samples of Z that are averaged to obtain $\overline{Z}$ are independent of each other, then $r_{ij}$ is 0 for all cases, except for the case i=j, when $r_{ij}$ is 1.0.

In this case, we get $$\overline{V}_1 = \gamma V_1, \tag{12}$$

where $$\gamma = \sum_{i=1}^{K} w_i^2. \tag{13}$$

Because the $w_{iS}$ are all positive and sum to one, it is easy to see that $0 \leqq \gamma \leqq 1$. Thus, we get $$\overline{V}_1 = \gamma V_1 \leqq V_1. \tag{14}$$

At the other extreme, if all the values of Z used to $\overline{Z}$ obtain are identical, then $r_{ij}=1.0$ for all i and j, and we get $|\overline{V}_1| = |V_1|$. In general, because $|r_{ij}| \leqq 1$, and $$\sum_{i=1}^{K}\sum_{j=1}^{K} w_i w_j = \left(\sum_{j=1}^{K} w_j\right) = 1, \tag{15}$$

and all the $w_j$ values are positive, we get $$0 \le \sum_{i=1}^{K}\sum_{j=1}^{K} w_i w_j r_{ij} \le 1.0 \tag{16}$$

leading to $$\bar{V}_1 \leqq V_1. \tag{17}$$

Thus, the variance of class $C_1$ for $\bar{Z}$ is no greater than that for Z. Specifically, if the sum of the squares of the weights is lesser than one, i.e., $\gamma \leqq 1$ and any of the $r_{ij}$s are lesser than one, then $\bar{V}_1 \leqq V_1$. Similarly, $\bar{V}_2 \leqq V_2$, if $\gamma \leqq 1$ and any of the $r_{ij}$ are lesser than one.

Hence, we can write $$c_1\bar{V}_1+c_2\bar{V}_2=\beta(c_1V)_1+(c_2V)_2, \tag{18}$$

where $\beta \leqq 1$, and is strictly less than one if $\gamma<1$, and any of the $r_{ij}$s are lesser than one.

The F-ratio of the classes for the new random variable $\bar{Z}$ is given by $$\begin{aligned} \bar{F}(C_1, C_2) &= \frac{(\bar{\mu}_1 - \bar{\mu}_1)^2}{c_1\bar{V}_1 + c_2\bar{V}_2} \\ &= \frac{(\bar{\mu}_1 - \bar{\mu}_1)^2}{\beta(c_1\bar{V}_1 + c_2)\bar{V}_2)} \\ &= \frac{F(C_1, C_2)}{\beta}. \end{aligned} \tag{19}$$

If we can ensure that $\beta$ is less than one, then the F-ratio of the averaged random variable $\bar{Z}$ is greater than that of the original random variable Z.

This fact can be used to improve the separation between speech and non-speech classes in the likelihood space by representing each frame of the audio signal by the weighted average 105 of the likelihood-difference values of a small window of frames around that frame, rather than by the likelihood difference itself.

Because the relative covariances between all the frames within the window are not all one, the $\beta$ value for the new weighted averaged likelihood-difference feature 105 is also less than one. If the likelihood-difference value of the $i^{th}$ frame is represented as $L_i$, the averaged value 105 is given by $$\bar{L}_i \sum_{j=-K_1}^{K_2} w_j L_{i+j}. \tag{20}$$

In fact, the averaging operation 130 improves the separability between the classes even when applied to the two-dimensional likelihood space.

To improve the F-ratio, one of the criteria for averaging is that all the samples within the window that produces the averaged feature must belong to the same class. For a continuous signal, there is no way of ensuring that any window contains only the signal of the same class. However, in an audio signal, speech and non-speech frames do not occur randomly. Rather, they occur in contiguous sections. As a result, except for the transition points between speech and non-speech, which are relatively infrequent in comparison to the actual number of speech and non-speech frames, most windows of the signal contain largely one kind of signal, provided the windows are sufficiently short.

Thus, the averaging operation 130, as described above, results in an increase in the separation between speech and non-speech classes in most signals. Therefore, we use the averaged likelihood-difference features 105 to represent frames of the signal to be segmented.

In the following sections, we address the problem of determining which frames represent speech, based on these one-dimensional features.

Threshold Identification for Endpoint Detection

The separated features 105, as described above, has two distinct modes 106-107, with an inflection point 108 between the two modes. The inflection point can than be used as a threshold T 109 to classify a frame of the input audio signal 101 as either non-speech or speech. One of the modes 106 represents the distribution of speech and the other mode 107 the distribution of non-speech. The inflection point 108 represents the approximate position where the two distributions cross over and locates the optimal decision threshold separating the speech and non-speech classes. A vertical line through the lowest part of the inflection is the optimal decision threshold between the two classes.

In general, histograms of the smoothed likelihood-difference show two distinct modes, with an inflection point between the two. The location of the inflection point is a good estimate of the optimal decision threshold between the two classes. The problem of identifying the optimum decision threshold is therefore one of identifying 140 the position of this inflection point.

The inflection point is not easy to locate. The surface of the bi-modal structure of the histogram of the likelihood differences is not smooth. Rather, the surface is ragged with many minor peaks and valleys. The problem of finding the inflection point is therefore not merely one of finding a minimum.

In the following sections we propose two methods of identifying the inflection point: Gaussian mixture fitting and polynomial fitting.

Gaussian Mixture Fitting

In Gaussian mixture fitting, we model the distribution of the smoothed likelihood difference features of the audio signal as a mixture of two Gaussian distributions. This is equivalent to estimating the histogram of the features as a mixture of two Gaussian distributions. One of the two Gaussian distributions is expected to capture the speech mode, and the other distribution the non-speech mode.

The Gaussian mixture distribution itself is determined using an expectation maximization (EM) process, see Dempster, A. P., Laird, N. M., and Rubin, D. B., "*Maximum likelihood from incomplete data via the EM algorithm*," J. Royal Stat. Soc., Series B, 39, 1-38, 1977.

The decision threshold between the speech and non-speech classes is estimated as the point at which the two Gaussian distributions cross over. If we represent the mixture weight of the two Gaussians as $c_1$ and $c_2$, respectively, their means as $\mu_1$ and $\mu_2$, and their variances as $V_1$ and $V_2$, respectively, the crossover point is the solution to the equation $$\frac{c_1}{\sqrt{2\pi V_1}} e^{\frac{-(x-\mu_1)^2}{2V_1}} = \frac{c_2}{\sqrt{2\pi V_2}} e^{\frac{-(x-\mu_2)^2}{2V_2}}. \tag{21}$$

By taking logarithms on both sides, this reduces to $$\frac{(x-\mu_1)^2}{2V_1} - \log(c_1) + 0.5\log(V_1) = \frac{(x-\mu_2)^2}{2V_2} - \log(c_2) + 0.5\log(V_2). \tag{22}$$

This is a quadratic equation, which has two solutions. Only one of the two solutions lies between $\mu_1$ and $\mu_2$. The value of this solution is the crossover point between the two Gaussian distributions and is an estimate of the optimum classification threshold.

The Gaussian mixture fitting based threshold 109 can overestimate the decision threshold, in the sense that the estimated decision threshold results in many more non-speech frames being tagged as speech frames than would be the case with the optimum decision threshold. This happens when the speech and non-speech modes are well separated. On the other hand, Gaussian mixture fitting is very effective in locating the optimum decision boundary in cases where the inflection point does not represent a local minimum.

Polynomial Fitting

In polynomial fitting, we obtain a smoothed estimate of the contour of the bi-modal histogram using a polynomial. Direct modeling of the contour as a polynomial is not generally effective, and the resulting polynomials frequently do not model the inflection points of the histogram effectively. Instead, we fit a polynomial to the logarithm of the histogram distribution, incrementing all bins by one, prior to taking the logarithm.

Let $h_i$ represent the value of the $i^{th}$ bin in the histogram. We estimate the coefficients of the polynomial $$H(i)=a_K i^K + a_{K-1} i^{K-1} + \ldots + a_1 i + a_{0)-1}, \tag{23}$$

where K is the order of the polynomial, e.g., the $6^{th}$ order, and $a_K$, $a_{K-1}$, . . . , $a_0$ are the coefficients of the polynomial, such that an error $$E = \sum_i (H(i)) - \log(h_i + 1))^2 \tag{24}$$

is minimized. Optimizing E for the $a_i$ coefficient values results in a set of linear equations that can be solved for the polynomial coefficients. The smoothed fit to the histogram can now be obtained from H(i) by reversing the log and addition by one as $$\tilde{H}(i)=\exp(h(i))-1=\exp(a_K i^K + a_{K-1} i^{K-1} + \ldots + a_1 i + a_{0)-1}. \tag{25}$$

Identifying the inflection point can now be done by locating the minimum value of this contour. Note that the operation represented by equation (25) need not really be performed in order to locate the inflection point.

Because the exponential function is a monotonic function, the inflection point can be located on H(i) itself. The inflection point gives us the index of the histogram bin within which the inflection point lies because the polynomial is defined on the indices of the histogram bins, rather than on the centers of the bins. The center of the bins gives us the optimum decision threshold 109. In histograms where the inflection point does not represent a local minimum, other criteria, such as higher order derivatives, can be used.

Implementation of the Segmenter

In this section, we describe two implementations for the segmenter: a batch-mode implementation, and a real-time implementation. In the former, endpointing is done on a pre-recorded audio signal and real-time constraints do not apply. In the latter, the end-pointing identifies beginnings and endings of speech segments with only a short delay and, therefore, has a minimal dependence on future samples of the signal.

In both implementations, a suitable initial feature representation 102 is first selected. Then, likelihood difference features 103 are derived for each frame of the audio signal. From the difference features, averaged likelihood-difference features 105 are determined 120 using equation (20).

The averaging window can be either symmetric, or asymmetric, depending on the particular implementation. The width of the averaging window is typically forty to fifty frames. The shape of the window can vary. We find that a rectangular or Hamming window is particularly effective. A rectangular window can be more effective when inter-speech gaps of silence are long, whereas the Hamming window is more effective when shorter silent gaps are expected. The resulting sequence of averaged likelihood differences is used for endpoint detection.

Each frame is then classified as speech or non-speech by comparing its average likelihood-difference against the threshold T 109 that is specific to the frame. The threshold T 109 for any frame is obtained from the histogram derived over a portion of the signal spanning several thousand frames including the frame to be classified. In other words, the discriminant used to classify is continuously. The exact placement of this portion is dependent on the particular implementation. After all frames are classified as speech or non-speech, contiguous frames having the same classification are merged 160, and speech segments that are shorter than a predetermined length of time, e.g., 10 ms, are discarded. Finally, all speech segments 161 are extended, at the beginning and the end, by about half the width of the averaging window.

Batch-Mode Implementation

In the batch-mode implementation, the entire audio signal 101 is available for processing. As a result, the signal from both the past and the future of any segment of speech can be used when classifying 150 the frames. In this case, the main goal is segmentation of the signal in the true sense of the word, i.e., extracting entire complete segments of speech 161 from the continuous input signal 101.

In this case, the averaging window used to obtain the averaged likelihood difference is a symmetric rectangular window, about fifty frames wide. The histogram used to determine the threshold for any frame is derived from a segment of signal centered around that frame. The length of this segment is about fifty seconds when background noise conditions are expected to be reasonably stationary, and shorter otherwise. Merging of adjacent frames into segments, and extending speech segments is performed 160 after the classification 150 as a post-processing step.

Real-Time Implementation

The real-time implementation can be used to segment a continuous speech signal. In such an implementation, it is necessary to identify the speech segments without delay in a fraction of a second so that all of the speech in the signal can be recognized.

The various parameters of the segmenter must be suitably adapted to the situation. For real-time implementation, the averaging window is asymmetric, but remains 40 to 50 frames wide. The weighting function is also asymmetric. An example of a function that we have found to be effective is one constructed using two unequal sized Hamming windows. The lead portion of the window, that covers frames after the current frame, is half of an 8 frame wide Hamming window, and covers four frames. The lag portion of the window, that applies prior frames, is the initial half of a 70-90 frame wide Hamming window, and covers between 35 and 45 frames. We note here that any similar skewed window may be applied.

The histogram used for determining the decision threshold 109 for any frame is determined from the 30 to 50 second long segment of the signal immediately prior to, and including, the current frame. When the first frame that is classified 150 as a speech is identified, the beginning of a speech segment 161 is marked as having begun half an averaged window size number of frames prior to the first speech frame. The end of the speech segment 161 is marked at the halfway point of the first window size length sequence of non-speech frames following a speech frame.

EFFECT OF THE INVENTION

The invention provides a method for segmenting a continuous audio signals into non-speech and speech segments. The segmentation is performed using a combination of classification and clustering techniques by using classifier distributions to project features into a low-dimensionality space where clustering techniques can be applied effectively to separate speech and non-speech events. In order to enable the clustering to perform effectively, the separation between classes is improved by an averaging operation. The performance of the method according to the invention is comparable to that obtained with manually obtained segmentation in moderate and highly noisy speech.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for segmenting an audio signal including a plurality of frames, comprising:

extracting high-dimensional features from the audio signal;

projecting non-linearly the high-dimensional features to low-dimensional features;

averaging the low-dimensional features;

applying a linear discriminant to the averaged low-dimensional features to determine a threshold;

classifying each frame of the audio signal as either non-speech or speech using the threshold and the averaged low-dimensional features.

2. The method of claim 1 wherein the audio signal is continuous.

3. The method of claim 2 further comprising:

updating the threshold continuously.

4. The method of claim 1 wherein the high-dimensional features have twenty-six dimensions and the low-dimensional features have two dimensions.

5. The method of claim 1 wherein each dimension is a monotonic function.

6. The method of claim 5 wherein the monotonic function is a logarithm of a probability of each feature.

7. The method of claim 1 wherein the non-linear projection is a likelihood projection.

8. The method of claim 1 further comprising:

projecting the low-dimensional features onto an axis as a one-dimensional projection.

9. The method of claim 8 wherein a histogram of the one-dimensional projection has a bi-modal distribution connected by an inflection point defining the threshold.

10. The method of claim 9 further comprising:

fitting a Gaussian mixture distribution to the bi-modal distribution to determine the threshold.

11. The method of claim 10 wherein the Gaussian mixture distribution is determined using an expectation maximization process.

12. The method of claim 9 further comprising:

fitting a polynomial function to the bi-modal distribution to determine the threshold.

13. The method of claim 12 wherein the polynomial function is a logarithm of a distribution of the histogram.

14. The method of claim 1 further comprising:

representing each frame of the audio signal as a weighted average of likelihood-difference values of a window of frames around each frame.

15. The method of claim 1 wherein the audio signal is processed in batch-mode.

16. The method of claim 15 wherein an averaging window is symmetric.

17. The method of claim 16 wherein the averaging window is rectangular.

18. The method of claim 16 wherein the averaging window is a Hamming window.

19. The method of claim 1 wherein the audio signal is processed in real-time.

20. The method of claim 19 wherein an averaging window is asymmetric.

21. The method of claim 20 wherein the averaging window is constructed using two unequal sized Hamming windows.

22. The method of claim 1 wherein the high-dimensional features include spectral patterns and temporal dynamics of the audio signal.

23. The method of claim 1 wherein the high-dimensional features is a short-term Fourier transform of the audio signal.

24. The method of claim 1 further comprising:

merging adjacent identically classified frames into segments.

25. The method of claim 24 further comprising:

discarding speech segments shorter than a predetermined length.

26. The method of claim 25 wherein the predetermined length of time is ten milliseconds.

27. The method of claim 26 further comprising:

extending each speech segment at a beginning and an end by about half a width of an averaging window.

* * * * *